US 6,666,294 B2

(12) United States Patent  (10) Patent No.: US 6,666,294 B2
Edson et al.  (45) Date of Patent: Dec. 23, 2003

(54) BELT DRIVEN MECHANICAL BOOST POWER STEERING

(75) Inventors: Joey D. Edson, Seymour, MO (US); Billy L. Speer, Springfield, MO (US)

(73) Assignee: Dayco Products, LLC, Miamisburg, OH (US)

(*) Notice: Subject to any disclaimer, the term of this patent is extended or adjusted under 35 U.S.C. 154(b) by 50 days.

(21) Appl. No.: 10/044,079

(22) Filed: Jan. 10, 2002

(65) Prior Publication Data
US 2003/0127279 A1 Jul. 10, 2003

(51) Int. Cl.$^7$ .................................................. B62D 5/04
(52) U.S. Cl. ...................... 180/444; 180/443; 180/447; 74/388 PS
(58) Field of Search ................................. 180/444, 446, 180/447, 422, 6.2, 400, 402, 443; 280/93.5 C; 74/498, 388 PS; 192/48.9

(56) References Cited

U.S. PATENT DOCUMENTS

| 4,101,004 | A | * | 7/1978 | Oltman ........................ 180/6.2 |
| 4,391,340 | A | * | 7/1983 | DeLorean .................... 180/400 |
| 4,754,830 | A | * | 7/1988 | Morishita et al. ........... 180/446 |
| 4,757,869 | A | * | 7/1988 | Morishita et al. ........... 180/446 |
| 5,236,335 | A | * | 8/1993 | Takeuchi et al. ............ 180/446 |
| 5,450,916 | A | * | 9/1995 | Budaker et al. ............. 180/444 |
| 5,732,791 | A | * | 3/1998 | Pinkos et al. ................ 180/444 |
| 5,999,870 | A | * | 12/1999 | Tatsumi et al. .............. 701/43 |
| 6,085,634 | A | | 7/2000 | Dietrich |
| 6,092,618 | A | | 7/2000 | Collier-Hallman |
| 6,138,787 | A | | 10/2000 | Miotto |
| 6,152,106 | A | | 11/2000 | Reese, II et al. |
| 6,220,414 | B1 | | 4/2001 | Nagaya et al. |
| 6,260,356 | B1 | | 7/2001 | Baughn et al. |
| 6,268,708 | B1 | | 7/2001 | Kawada et al. |
| 6,318,496 | B1 | * | 11/2001 | Koehler et al. ............. 180/444 |
| 6,370,459 | B1 | * | 4/2002 | Phillips ........................ 701/41 |
| 6,488,115 | B1 | * | 12/2002 | Ozsoylu et al. ............. 180/444 |
| 2002/0189888 | A1 | * | 12/2002 | Magnus et al. ............. 180/402 |

FOREIGN PATENT DOCUMENTS

| JP | 63203479 A | * | 8/1988 | ........... B62D/11/08 |
| JP | 03143738 A | * | 6/1991 | ........... B60K/17/06 |

* cited by examiner

Primary Examiner—Lesley D. Morris
Assistant Examiner—Daniel Yeagley
(74) Attorney, Agent, or Firm—Joseph V. Tassone; J. Daniel Lykins

(57) ABSTRACT

A belt driven power steering system for use in a vehicle to eliminate energy waste. The belt driven power steering system includes a belt driven pulley powered by an engine crankshaft in the vehicle; a first gear operably connected to the pulley via a first shaft, the first gear providing power rotation in one direction; a second gear aligned with and driven by the first gear, the second gear providing power rotation in a direction opposite to the power rotation of the first gear; power control means operably connected to the first gear and to the second gear to provide power in the desired direction; a steering system operably connected to the power control means to steer the vehicle to the left or to the right; a steering wheel operably connected to the power control means wherein the power provided to the control means is based on driver input to the steering system via the steering wheel; and torque sensing mean for sensing the torque applied to the steering wheel by the driver input to steer the vehicle in a direction to the left or to the right.

20 Claims, 1 Drawing Sheet

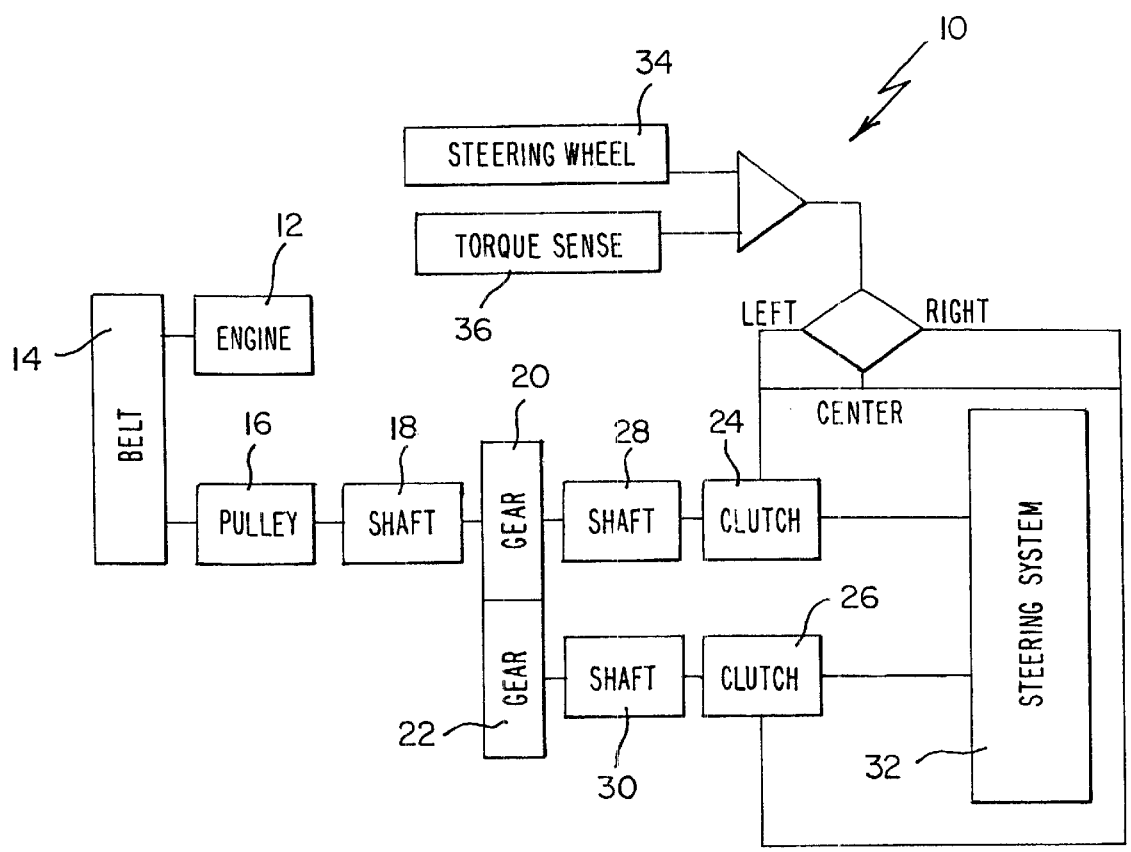

BELT DRIVEN MECHANICAL BOOST POWER STEERING

BACKGROUND OF THE INVENTION

The present invention relates to automotive power steering systems, and more specifically to a belt driven power steering system which provides power boost for assisting the driver in steering a vehicle without the need for the multiple energy conversions of current systems.

Hydraulic power steering systems generally have become a standard feature throughout the automotive industry and are particularly advantageous in medium and larger sized automobiles. Typically, in a power steering system, the engine crankshaft drives the power steering pump through a belt and pulley arrangement. The power steering pump includes a pressure hose and a return line, and generally includes a control valve to modulate fluid pressure within the hydraulic system. The power steering pump generates fluid pressure. When the operator turns the steering wheel, the fluid pressure is directed to mechanically or electrically assist displacement of the steering assembly. In all the current variations of power assist steering systems, the two main types available are hydraulic and electric. Whether the power assist steering system is hydraulic or electric, the effect of the particular system on the overall efficiency of the vehicle is that of converting energy twice. In the case of the hydraulic system, engine or mechanical power is converted to hydraulic power through the use of a pump, and then converted back to mechanical power with a cylinder or motor. For the electric type, mechanical power is converted to electrical power by way of the generator and then converted back to mechanical power with a motor. Both of these systems require double conversion of energy resulting in substantial losses of energy requiring the engine to provide much more energy than is needed to do the work of turning the wheels of the vehicle to accomplish the desired function of power assisted steering. Therefore, it is an object of the present invention to provide a solution for reducing the loss of energy in power assist steering systems.

SUMMARY OF THE INVENTION

In accordance with the present invention, a belt driven power transmission boosting system is described which provides power boost for assisting the driver in steering a vehicle without the energy conversions of current systems. Historically, power delivery has been provided by the engine through a pulley and belt assembly. The present invention also employs that configuration wherein power control utilizes at least two hysteresis clutches to deliver power from the engine. This system is very efficient since the amount of power needed to control the hysteresis clutch is very small compared to the power transferred. Furthermore, the system allows fully variable and controllable quantities of power to be applied to assist the driver in steering the vehicle. The present system requires simple control strategies and provides power to assist in steering the vehicle without the losses of energy conversion inherent in current systems.

BRIEF DESCRIPTION OF THE DRAWING

The FIGURE is a block diagram of a belt driven mechanical boost power assist steering system in accordance with the present

DETAILED DESCRIPTION OF THE INVENTION

The present invention provides a belt driven mechanical boost power steering system for assisting the driver of a vehicle in steering the vehicle without the energy conversions of prior art systems. Three components are needed in order to produce mechanical power to help with the steering of the vehicle: power delivery, power control and power reversibility. The present invention uses a belt driven system to deliver power. The power control employs a device known as a hysteresis clutch which uses electrical signals to control the coupling between the input and output of the device. The power to control the hysteresis clutch is very small compared to the power transferred by the hysteresis clutch. In accordance with the invention, the hysteresis clutch system is placed between the belt and the steering system and allows fully variable and controllable quantities of power to be applied to assist the driver in steering the vehicle. The third component or power reversibility is accomplished by applying input power from the belt-driven pulley to a multiple gear arrangement to provide power to the steering system.

According to the invention, a belt driven power steering system for use in a vehicle to eliminate energy waste. The belt driven power steering system includes a belt driven pulley powered by an engine crankshaft in the vehicle; a first gear operably connected to the pulley via a first shaft, the first gear providing power rotation in one direction; a second gear aligned with and driven by the first gear, the second gear providing power rotation in a direction opposite to the power rotation of the first gear; power control means operably connected to the first gear and to the second gear to provide power in the desired direction; a steering system operably connected to the power control means to steer the vehicle to the left or to the right; a steering wheel operably connected to the power control means wherein the power provided to the control means is based on driver input to the steering system via the steering wheel; and torque sensing mean for sensing the torque applied to the steering wheel by the driver input to steer the vehicle in a direction to the left or to the right.

As illustrated in the block diagram shown in the FIGURE, a power steering assist system 10 contains an engine 12 having a crankshaft (not shown) and a belt 14 operably connected thereto. The belt 14 drives a pulley 16 operably connected to a shaft 18 onto which a first gear 20 is affixed. The first gear 20 mates with and drives an identical second gear 22 to provide rotation in the opposite direction to that of the first shaft 18. First gear 20 and second gear 22 are connected to two hysteresis clutches 24 and 26 via parallel shafts 28 and 30. The hysteresis clutches are powered by an electrical power source which provides electrical signals to control coupling between the input and the output of the steering system 32. Preferably, the electrical power source is the vehicle ignition control system. This arrangement supplies power to the steering system 32 via the two hysteresis clutches 24 and 26 on shafts 28 and 30 to couple their output to the steering system 32. Control of the hysteresis clutches 24 and 36 such that one or the other is energized, will provide power in the desired direction, i.e., to the left or to the right, with power variability based upon the design of the hysteresis clutches 24 and 26 and control of the hysteresis clutches 24 and 26 based upon driver input to the steering wheel 34 as sensed by the torque sensing device 36.

While a particular embodiment of the invention has been shown and described, other variations and alternate embodiments will occur to those skilled in the art. Accordingly, it is intended that the present invention be limited only in terms of the appended claims.

What is claimed is:

1. A belt driven power steering assist system for use in a vehicle to eliminate energy waste comprising:
   a belt driven pulley powered by an engine crankshaft in said vehicle;
   a first gear operably connected to said pulley via a first shaft, said first gear providing power rotation in one direction;
   a second gear aligned with and driven by said first gear, said second gear providing power rotation in a direction opposite to the power rotation of said first gear;
   power control means operably connected to said first gear and to said second gear to provide power in the desired direction;
   a steering system operably connected to said power control means to steer said vehicle to the left or to the right;
   a steering wheel operably connected to said power control means wherein said power provided to said control means is based on driver input to said steering system via said steering wheel; and
   sensing mean for sensing the torque applied to said steering wheel by said driver input to steer said vehicle in a direction to the left or to the right.

2. The belt driven power steering assist system of claim 1 wherein said power control means comprises a first power control means operably connected to said first gear via a second shaft and a second power control means operably connected to said second gear via a third shaft, wherein said first power control means and said second power control means couple their output to said steering system such that energizing said first power control means or said second power control means provides power in the desired direction.

3. The belt driven power steering assist system of claim 2 wherein said steering system is operably connected to said first power control means and to said second power control means, wherein said steering system utilizes said power provided by said first control means and said second power control means to steer said vehicle to the left or to the right.

4. The belt driven power steering assist system of claim 2 wherein said steering wheel is operably connected to said first power control means and to said second power control means wherein said power provided to said first power control means and to said second power control means is based on driver input to said steering system via said steering wheel to steer said vehicle to the left or to the right.

5. The belt driven power steering assist system of claim 1 wherein said sensing mean for sensing the torque applied to said steering wheel by said driver input to steer said vehicle in a direction to the left or to the right is a torque sensor.

6. The belt driven power steering assist system of claim 1 wherein said power control means is a hysteresis clutch.

7. The belt driven power steering assist system of claim 6 further comprising an electrical power source operable connected to said hysteresis clutch, said electrical power source providing electrical signals to control coupling between input and output of said hysteresis clutch.

8. The belt driven power steering assist system of claim 7 wherein said electrical power source is a vehicle ignition control system.

9. A belt driven power steering assist system for use in a vehicle to eliminate energy waste comprising:
   a belt driven pulley powered by an engine crankshaft in said vehicle;
   a first gear operably connected to said pulley via a first shaft, said first gear providing power rotation in one direction;
   a second gear aligned with and driven by said first gear, said second gear providing power rotation in a direction opposite to the power rotation of said first gear;
   a first power control means operably connected to said first gear via a second shaft;
   a second power control means operably connected to said second gear via a third shaft, wherein said first power control means and said second power control means couple their output to a steering system such that energizing said first power control means or said second power control means provides power in the desired direction;
   said steering system operably connected to said first power control means and to said second power control system to steer said vehicle to the left or to the right;
   a steering wheel operably connected to said first power control system and to said second power control means wherein said power provided to said first power control means and to said second power control means is based on driver input to said steering system via said steering wheel; and
   sensing mean for sensing the torque applied to said steering wheel by said driver input to steer said vehicle in a direction to the left or to the right.

10. The belt driven power steering assist system of claim 9 wherein said first power control means is a first hysteresis clutch.

11. The belt driven power steering assist system of claim 9 wherein said first hysteresis clutch is powered by an electrical power source, said electrical power source providing electrical signals to control a coupling between input and output sides of said first hysteresis clutch.

12. The belt driven power steering assist system of claim 11 wherein said electrical power source is a vehicle ignition control system.

13. The belt driven power steering assist system of claim 9 wherein said second power control means is a second hysteresis clutch.

14. The belt driven power steering assist system of claim 13 wherein said second hysteresis clutch is powered by an electrical power source, said electrical power source providing electrical signals to control a coupling between input and output of said second hysteresis clutch.

15. The belt driven power steering assist system of claim 14 wherein said electrical power source is a vehicle ignition control system.

16. A belt driven power steering assist system for use in a vehicle to eliminate energy waste comprising:
   a belt driven pulley powered by an engine crankshaft in said vehicle;
   a first gear operably connected to said pulley via a first shaft, said first gear providing power rotation in one direction;
   a second gear aligned with and driven by said first gear, said second gear providing power rotation in a direction opposite to the power rotation of said first gear;
   a first hysteresis clutch operably connected to said first gear via a second shaft;
   a second hysteresis clutch operably connected to said second gear via a third shaft, wherein said first hysteresis clutch and said second hysteresis power clutch couple their output to a steering system such that energizing said first hysteresis clutch or said second hysteresis clutch provides power in the desired direction;

said steering system operably connected to said first hysteresis clutch and to said second hysteresis clutch to steer said vehicle to the left or to the right;

a steering wheel operably connected to said first hysteresis clutch and to said second hysteresis power clutch wherein said power provided to said first hysteresis clutch and to said second hysteresis clutch is based on driver input to said steering system via said steering wheel; and torque sensing means for sensing the torque applied to said steering wheel by said driver input to steer said vehicle in a direction to the left or to the right.

17. The belt driven power steering assist system of claim 16 wherein said first hysteresis clutch is powered by an electrical power source, said electrical power source providing electrical signals to control coupling between input and output of said first hysteresis clutch.

18. The belt driven power steering assist system of claim 17 wherein said electrical power source is a vehicle ignition control system.

19. The belt driven power steering assist system of claim 16 wherein said second hysteresis clutch is powered by an electrical power source, said electrical power source providing electrical signals to control coupling between input and output of said second hysteresis clutch.

20. The belt driven power system of claim 19 wherein said electrical power source is a vehicle ignition control system.

* * * * *